(12) United States Patent
Satyanarayana et al.

(10) Patent No.: US 11,971,195 B2
(45) Date of Patent: Apr. 30, 2024

(54) WATER TANK WITH THERMALLY INSULATING PARTITION

(71) Applicant: Rheem Manufacturing Company, Atlanta, GA (US)

(72) Inventors: Harsha Satyanarayana, Bristol, CT (US); Christopher M. Hayden, Shelton, CT (US); Abigail McMonigal, Wyoming, OH (US)

(73) Assignee: Rheem Manufacturing Company, Atlanta, GA (US)

( * ) Notice: Subject to any disclaimer, the term of this patent is extended or adjusted under 35 U.S.C. 154(b) by 306 days.

(21) Appl. No.: 17/022,183

(22) Filed: Sep. 16, 2020

(65) Prior Publication Data

US 2022/0082296 A1    Mar. 17, 2022

(51) Int. Cl.
*F24H 1/10*    (2022.01)

(52) U.S. Cl.
CPC .................................. *F24H 1/102* (2013.01)

(58) Field of Classification Search
CPC .......... F24H 9/2021; F24H 1/202; F24H 1/18; F28D 20/0039
USPC ................. 392/451, 467, 485; 122/19.1, 149
See application file for complete search history.

(56) References Cited

U.S. PATENT DOCUMENTS 4,598,694 A * 7/1986 Cromer ..................... F24H 1/18
  126/640
5,906,109 A * 5/1999 Dieckmann ............... F24H 4/04
  237/2 B 2005/0005879 A1    1/2005 Houle
2015/0022190 A1 *  1/2015 Taylor .................. H03B 5/1256
  331/167
2019/0366985 A1 * 12/2019 Kinder .................... F15B 7/003

FOREIGN PATENT DOCUMENTS

| JP | 2011220572 A | * | 11/2011 |
| RU | 120754 A | | 9/2012 |
| WO | 2009079791 A1 | | 7/2009 |
| WO | 2011078767 A1 | | 6/2011 |

OTHER PUBLICATIONS

Machine Translation of JP2011220572A (Year: 2023).*
International Search Report and Written Opinion for PCT Application No. PCT/US2021/050154 dated Dec. 9, 2021.

* cited by examiner

*Primary Examiner* — Nathaniel E Wiehe
*Assistant Examiner* — Thomas J Ward
(74) *Attorney, Agent, or Firm* — Eversheds Sutherland (US) LLP

(57) ABSTRACT

The disclosed technology includes a liquid storage tank having a heating element, an inlet for receiving unheated liquid, an outlet for outputting heated liquid, and a partition configured to divide the tank into a first portion and a second portion. The partition can have an aperture such that the first portion and the second portion are in fluid communication. The liquid storage tank can include an actuator in mechanical communication with the partition and configured to linearly move at least a portion of the partition based at least in part on the temperature of liquid within the tank.

20 Claims, 11 Drawing Sheets

WATER TANK WITH THERMALLY INSULATING PARTITION

FIELD OF THE DISCLOSURE

The present invention relates generally to a partition for dividing a liquid storage tank, and more particularly, to a thermally insulating non-variable and variable partition for dividing a liquid storage tank.

BACKGROUND

Traditional liquid heating devices include storage tanks configured to receive unheated water and output heated water. Typically, all of the water within the storage tank must be heated to a set temperature before a user can output heated water. As a result, the heating process can often be time-consuming and inefficient, particularly when the storage tank is relatively large in volume.

Further, as a storage tank outputs heated water, the storage tank can simultaneously or subsequently receive unheated water in order to meet the supply demand of heated water. When the unheated water flows into the storage tank, the overall temperature of water within the storage tank can be significantly reduced. Once the temperature of water within the storage tank is reduced due to the influx of unheated water, the water must be reheated to the set temperature, thereby reducing efficiency of the liquid heating device.

SUMMARY

These and other problems can be addressed by the technologies described herein. Examples of the present disclosure relate generally to a non-variable and variable partition positioned with a liquid storage tank to create a thermal barrier, thereby providing efficient heating of water.

The disclosed technology can include a liquid storage tank including a heating element, an inlet for receiving unheated liquid, an outlet for outputting heated liquid, and a thermal partition configured to divide the tank into a first portion and a second portion. The thermal partition can have an aperture such that the first portion and the second portion are in fluid communication.

The partition can have a substantially inverted conical shape.

A diameter of the thermal partition can be between approximately 4 and approximately 24 times greater than a diameter of the aperture.

The partition can include a plurality of apertures, and the thermal partition can have a diameter of between approximately 4 and approximately 24 times greater than a diameter of each aperture.

The first portion of the tank can include the heating element and the outlet, and the second portion includes the inlet.

The partition can be a first partition and the liquid storage tank can further include a second partition. The first partition and the second partition can be configured to divide the tank into three portions.

The disclosed technology can also include a liquid storage tank including a heating element, an inlet for receiving unheated liquid, an outlet for outputting heated liquid, a partition to divide the tank into a first portion and a second portion, and an actuator in mechanical communication with the partition. The partition can include an aperture such that the first portion and the second portion are in fluid communication. The actuator can be configured to linearly move at least a portion of the partition based at least in part on the temperature of liquid in the tank.

A diameter of the thermal partition can be between approximately 4 and approximately 24 times greater than a diameter of the aperture.

The actuator can include a piston. The piston can be disposed within a cylinder and the cylinder can be in fluid communication with a pump.

The partition can include an opening and the opening can be slidably disposed along a shaft.

The actuator can include a motor, the motor being in mechanical communication with the shaft and configured to linearly move the partition along the shaft.

The liquid storage tank can further include a plurality of temperature sensors, each of the plurality of temperature sensors configured to determine a local liquid temperature of liquid in the tank; and a plurality of position sensors configured to determine a position of the partition within the tank.

The plurality of temperature sensors can be arranged along a height of the tank.

The plurality of position sensors can be arranged along a height of the tank.

Each temperature sensor of the plurality of temperature sensors can be positioned proximate a position sensor of the plurality of position sensors.

The liquid storage tank can further include a controller in electrical communication with the actuator and the plurality of temperature sensors. The controller can be configured to receive, from the plurality of temperature sensors, temperature data indicative of a local liquid temperature corresponding to a location of each temperature sensor of the plurality of temperature sensors. The controller can be configured to compare each local liquid temperature to a threshold temperature. The controller can be configured to determine, based on a plurality of respective heights corresponding to the plurality of temperature sensors, a target partition height that is equal to a lowest height of the plurality of heights that corresponds to a local liquid temperature that is less than the threshold temperature. In response to determining that a current height of the partition does not equal the target partition height, the controller can be configured to output instructions for moving the partition to a location corresponding to the target partition height.

The controller can be further configured to determine the current height of the partition by receiving, from the plurality of position sensors, position data indicative of the current height of the partition.

The liquid storage tank can further include at least one valve disposed on the partition. The at least one valve can be in electrical communication with the controller, and the controller can be configured to output instructions to the at least one valve to open and closed based at least in part on the temperature data.

The disclosed technology can also include non-transitory, computer-readable medium storing instructions that, when executed by one or more processors, cause a liquid storage tank controller to receive, from the plurality of temperature sensors, temperature data indicative of a local liquid temperature corresponding to a location of each temperature sensor of the plurality of temperature sensors. The instructions can also cause the controller to compare each local liquid temperature to a threshold temperature. The instructions can also cause the controller to determine, based on a plurality of respective heights corresponding to the plurality of temperature sensors, a target partition height that is equal to a lowest height of the plurality of heights that corresponds to a local liquid temperature that is less than the threshold temperature. In response to determining that a current height of the partition does not equal the target partition height, the instructions can cause the controller to output instructions for moving the partition to a location corresponding to the target partition height.

These and other aspects of the present disclosure are described in the Detailed Description below and the accompanying figures. Other aspects and features of the present disclosure will become apparent to those of ordinary skill in the art upon reviewing the following description of specific examples of the present disclosure in concert with the figures. While features of the present disclosure may be discussed relative to certain examples and figures, all examples of the present disclosure can include one or more of the features discussed herein. Further, while one or more examples may be discussed as having certain advantageous features, one or more of such features may also be used with the various other examples of the disclosure discussed herein. In similar fashion, while examples may be discussed below as devices, systems, or methods, it is to be understood that such examples can be implemented in various devices, systems, and methods of the present disclosure.

BRIEF DESCRIPTION OF THE FIGURES

Reference will now be made to the accompanying figures, which are not necessarily drawn to scale, and wherein.

DETAILED DESCRIPTION

Figure 1A:
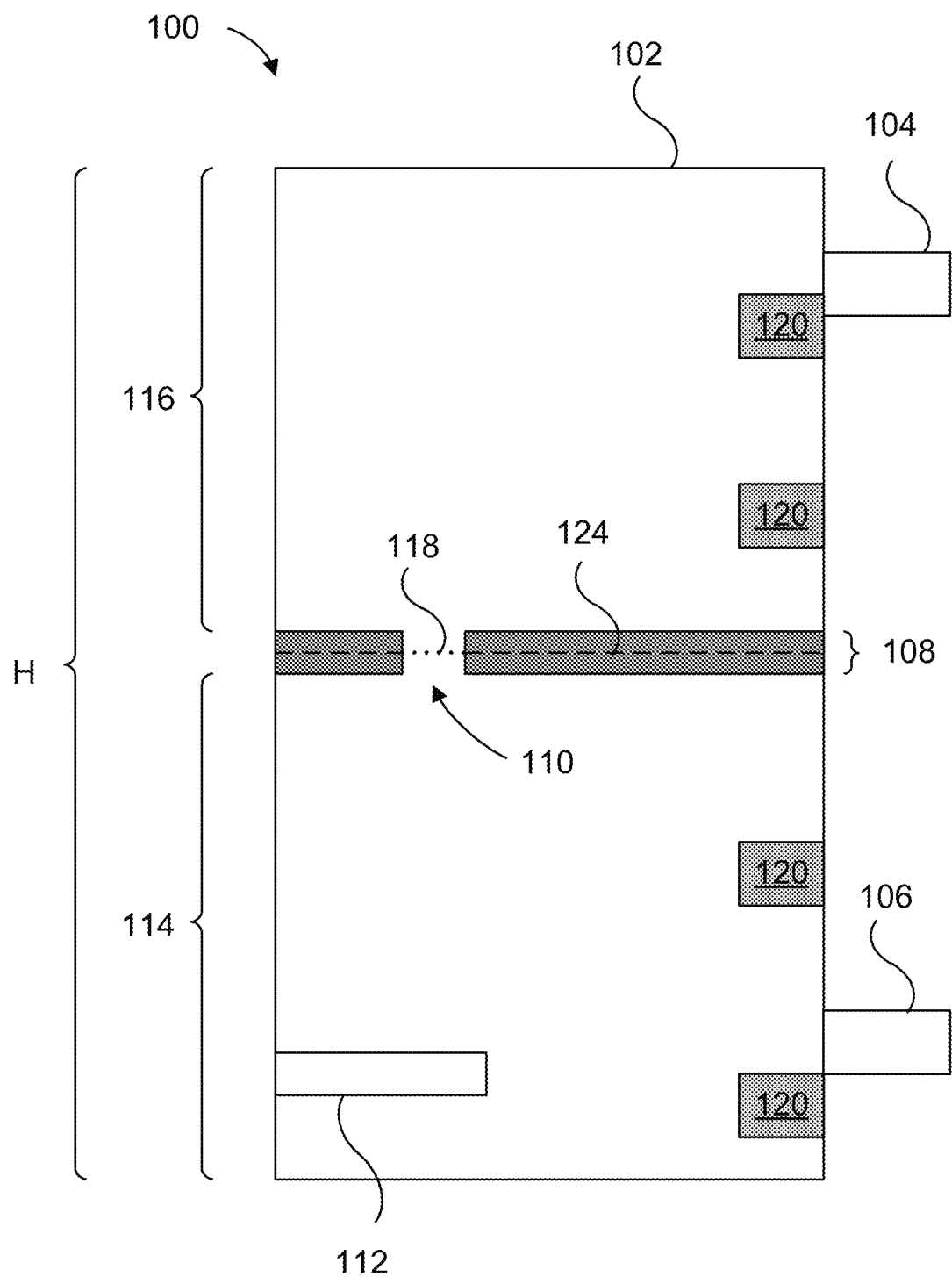
FIG. 1A illustrates a schematic diagram of a liquid heating device including an example partition, in accordance with the disclosed technology.

The disclosed technology includes a liquid storage tank having a thermal partition, which, among other things, can help increase the efficiency by which liquid in the liquid storage tank is heated. As will be described more fully herein, the partition can be a non-variable partition (which can also be referred to as a fixed partition or a static partition) or a variable partition (which can also be referred to as a moveable partition).

The non-variable partition can divide the liquid storage tank into a bottom portion and a top portion. The non-variable partition can have at least one aperture that can allow the bottom portion and the top portion to be in fluid communication such that a liquid (e.g., water) can flow therebetween. Upon activation of a heating element disposed within the storage tank, the water within the portion in which the heating element is disposed can become heated to the set temperature. As will be described more fully herein, the non-variable partition can significantly limit mixing of the heated water within the portion having the heating element with the unheated or less heated water within the portion not having the heating element, thereby reducing the time to heat the water within the portion having the heating element to the set temperature. Gradually, heat energy and heated water can flow from the heated portion to the unheated portion via the aperture(s) of the non-variable partition, allowing the water within the other portion to reach the set temperature.

The disclosed technology also includes a variable partition disposed within a liquid storage tank that divides the tank into a bottom portion and a top portion. The variable partition can be in mechanical communication with an actuator configured to linearly move at least some of the variable partition upwards and downwards within the tank based at least in part on the temperature of water. When the temperature of water within the tank is increasing due to activation of a heating element within the tank, the actuator can linearly move the variable partition upwards in relation to the height of the tank. When the temperature of water within the tank is decreasing due to an influx of unheated water via an inlet or deactivation of the heating element, the actuator can linearly move the variable partition downwards in relation to the height of the tank. By moving the variable partition upwards and downwards based at least in part on the temperature of water within the tank, the volume of water to be heated can be adjusted such that the water within the tank can reach the set temperature relatively quickly.

The disclosed technology will be described more fully hereinafter with reference to the accompanying drawings. This disclosed technology can, however, be embodied in many different forms and should not be construed as limited to the examples set forth herein. The components described hereinafter as making up various elements of the disclosed technology are intended to be illustrative and not restrictive. Such other components not described herein may include, but are not limited to, for example, components developed after development of the disclosed technology.

In the following description, numerous specific details are set forth. But it is to be understood that examples of the disclosed technology can be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," "one example," "an example," "some examples," "certain examples," "various examples," etc., indicate that the embodiment(s) and/or example(s) of the disclosed technology so described may include a particular feature, structure, or characteristic, but not every embodiment necessarily includes the particular feature, structure, or characteristic. Further, repeated use of the phrase "in one embodiment" or the like does not necessarily refer to the same embodiment, example, or implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described should be in a given sequence, either temporally, spatially, in ranking, or in any other manner.

Unless otherwise specified, all ranges disclosed herein are inclusive of stated end points, as well as all intermediate values. By way of example, a range described as being "from approximately 2 to approximately 4" includes the values 2 and 4 and all intermediate values within the range. Likewise, the expression that a property "can be in a range from approximately 2 to approximately 4" (or "can be in a range from 2 to 4") means that the property can be approximately 2, can be approximately 4, or can be any value therebetween. Further, the expression that a property "can be between approximately 2 and approximately 4" is also inclusive of the endpoints, meaning that the property can be approximately 2, can be approximately 4, or can be any value therebetween.

Unless otherwise specified, the terms liquid and/or water disclosed herein are inclusive of pure water ($H_2O$) and pure water plus any additives or additional component. Further, while the disclosed technology is referenced as be useful for water applications, it is to be understood that the disclosed technology can be used for any fluid, liquid or otherwise.

Referring now to the figures, FIGS. 1A through 1F illustrate a liquid heating device 100 including an example non-variable partition 108. The liquid heating device 100 can include a tank 102 for storing water. The tank 102 can be of any size, including but not limited to, 10-gallon, 15-gallon, 25-gallon, and 50-gallon. The tank 102 can include at least one heating element 112. The heating element 112 can be an electrical resistance element. Alternatively, the heating element 112 can be a burner. The tank 102 can include an inlet 104 for receiving unheated water and an outlet 106 for outputting heated water.

The non-variable partition 108 can be positioned within the tank 102 to horizontally divide the tank 102 into a bottom portion 114 and a top portion 116. The non-variable partition 108 can be affixed to the sidewalls of the tank 102 such that the non-variable partition 108 remains fixed in one position and/or location. The non-variable partition 108 can be affixed to the sidewalls of the tank 102 via one or more adhesives, welding, brazing, soldering, screws, bolts, and the like. Optionally, the non-variable partition 108 can be integral to the tank 102. The non-variable partition 108 can be positioned at approximately the middle of the tank 102. In this configuration, the bottom portion 114 and the top portion 116 can hold approximately the same volume of water. Alternatively, the non-variable partition 108 can be positioned closer to a top end of the tank 102 such that the bottom portion 114 can hold a greater volume of water as compared to the top portion. As another alternative, the non-variable partition 108 can be positioned closer to a bottom end of the tank 102 such that the top portion 116 can hold a greater volume of water as compared to the bottom portion 114. The non-variable partition 108 can have any thickness. The thickness of the non-variable partition 108 can depend on the size of the tank 102. The thickness of the non-variable partition 108 can be as small as possible while still capable of providing adequate thermal insulation. By way of example, the non-variable partition 108 can have a thickness of less than approximately 40 millimeters (1.5 inches). The non-variable partition 108 can be made of any material, including any thermally insulating material. By way of example, the non-variable partition 108 can be made of thermoplastic materials—including polypropylene, polyethylene, and/or polytetrafluoroethylene—glass, or glass filled polymers. The non-variable partition 108 can include at least one aperture 110 such that water can freely flow between the bottom portion 114 and the top portion 116. The aperture 110 can have any cross-sectional shape, including but not limited to, circular, triangular, rectangular, and polygonal.

As illustrated in FIGS. 1A through 1F, the inlet 104 of the tank 102 can be disposed proximate the top portion 116, and the outlet 106 can be disposed proximate the bottom portion 114. The heating element 112 can also be disposed within the bottom portion 114 such that the heating element 112 and the outlet 106 are disposed in the same portion. In this configuration, when the heating element 112 is activated, the water within the bottom portion 114 can become heated first. As the water becomes heated, the heated water can gradually begin to flow through the aperture 110 and into the top portion 116 (e.g., due at least in part to thermal stratification) such that the water within the top portion 116 can also become heated.

Alternatively, the heating element 112 can be disposed within the top portion. In this configuration, when the heating element 112 is activated, the water within the top portion 116 can become heated first. As the water becomes heated, the heated water can gradually begin to flow through the aperture 110 and into the bottom portion 114 (e.g., due at least in part to the flow of water created by water introduced from the inlet 104). Optionally, the inlet 104 and the outlet 106 can be interchanged such that the inlet 104 is disposed within the bottom portion 114 and the outlet 106 is disposed within the top portion 116. Optionally, the inlet 104 and the outlet 106 can both be disposed within the bottom portion 114 or top portion 116.

The tank 102 can optionally include one or more temperature sensors 120. The temperature sensors 120 can be disposed along a height H of the tank 102. The number of temperature sensors 120 can depend on the volumetric size of the tank 102. Optionally, the temperature sensors 120 can be arranged in an array. By way of example, and as illustrated in FIGS. 1A, 1C, and 1E, the tank 102 can include four temperature sensors 120, where two temperature sensors 120 can be disposed within the bottom portion 114 and two temperature sensors 120 can be disposed within the top portion 116. The temperature sensors 120 can send one or more signals to a controller or other data logging device indicative of the temperature of water proximate to each temperature sensor 120.

The non-variable partition 108 can create a thermal barrier within the tank 102, and thus, the non-variable partition 108 can slow the process of thermal stratification in which heated water can rise to the top of the tank 102 and unheated water can settle at the bottom. Thereby, the non-variable partition 108 can allow the water within the bottom portion 114 to be heated to the set temperature, while some of the heated water from the bottom portion 114 can move upwards and into the top portion 116 via the aperture 110. The set temperature can be user-defined and can be a singular temperature value or can be a range of temperature values. By way of example, the set temperature can be between approximately 120° F. and approximately 140° F. Because the non-variable partition 108 divides the storage tank 102 into portions, the volume of water that must be heated for a useable amount of water to reach the set temperature is reduced. Accordingly, the amount of time for at least a portion of the water and/or all of the water within the tank 102 to reach the set temperature can be reduced as compared to tanks without the non-variable partition 108.

By way of example, when the non-variable partition 108 is positioned at approximately the center of the tank 102, such that the volume of the bottom portion 114 is approximately the same as the volume of the top portion 116 and the heating element 112 is within the bottom portion 114, the water within the bottom portion 114 can reach the set temperature approximately 1.5 to 2.5 times faster than the top portion 116. Accordingly, in a tank 102 that can hold approximately 6 gallons of water that includes the non-variable partition 108 having a single aperture 110 of approximately 0.5 inches (approximately 13 mm), the water within the entire tank 102 can reach the set temperature approximately 33% faster as compared to a six-gallon tank without the non-variable partition 108. Once the water within the bottom portion 114 reaches the set temperature, water can be outputted via the outlet 106 for domestic and other uses. Thereby, it is not necessary to wait until the water within the entire tank reaches the set temperature before use. As will be appreciated, the actual time difference between heating water in the bottom portion 114 of a tank 102 with the non-variable partition 108 as compared to that of a tank without a partition can vary depending on, for example, the volume of the tanks, the volume of the bottom portion 114, the thermally insulative properties of the non-variable partition 108, and/or the size of the aperture 110. Regardless, a tank 102 having the non-variable partition 108 in accordance the disclosed technology can provide some amount of water heated to a set temperature faster than a tank lacking a partition.

Additionally, upon outputting heated water from the tank 102, the supply of water can be replenished by inputting unheated water via the inlet 104. The non-variable partition 108 can substantially reduce mixing of unheated water being inputted via the inlet 104 and heated water, as the non-variable partition 108 can substantially maintain the inputted unheated water within the portion of the tank 102 having the inlet 104 (e.g., the top portion 116). In configurations where the portion of the tank 102 having the inlet 104 is distinct from the portion of the tank 102 having the heating element 112 and the outlet, the unheated water and the heated water can remain substantially thermally separated (at least initially) by the non-variable partition 108. Accordingly, the temperature of water in the portion of the tank that has the heating element 112 can remain relatively unaffected as heated water is drawn from the heated portion of the tank and is replaced with unheated water from the opposite side of the non-variable partition 108. Additionally, the recovery time to heat the influx of unheated water to the set temperature can be reduced as compared to tanks 102 without the non-variable partition 108.

Figure 1B:
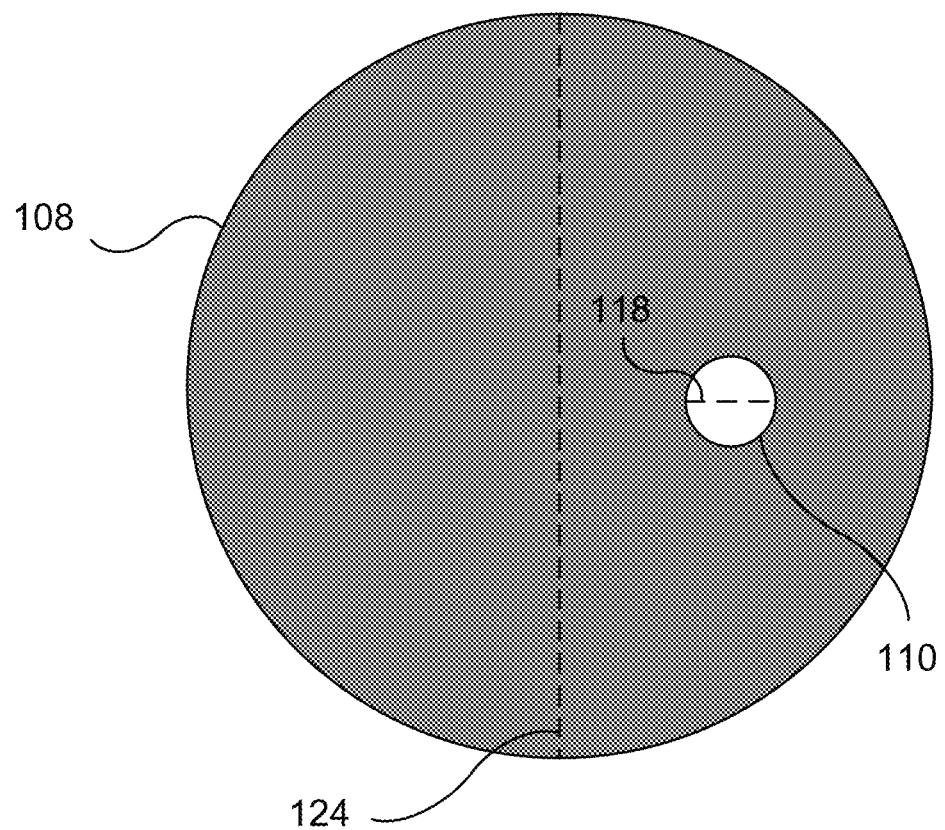
FIG. 1B illustrates a top view of the example partition of FIG. 1A, in accordance with the disclosed technology.
Figure 1C:
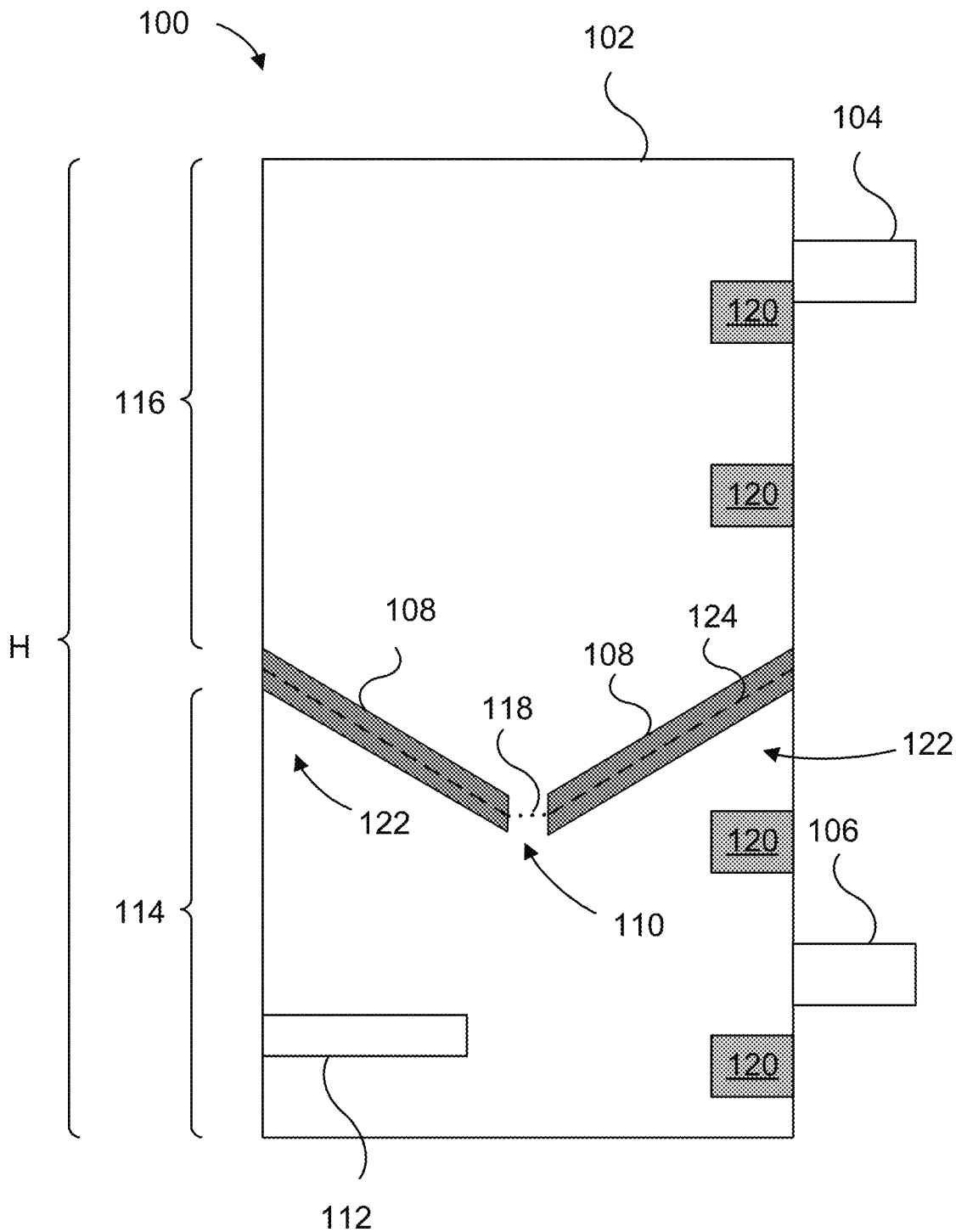
FIG. 1C illustrates a schematic diagram of a liquid heating device including an additional example partition, in accordance with the disclosed technology.
Figure 1D:
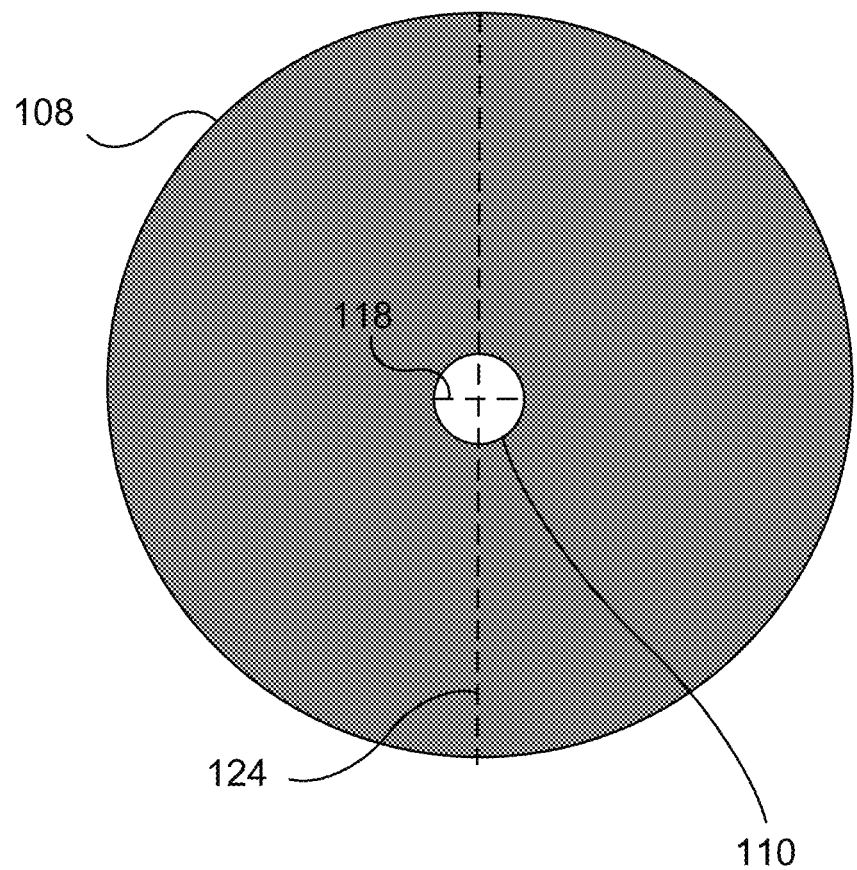
FIG. 1D illustrates a top view of the example partition of FIG. 1C, in accordance with the disclosed technology.
Figure 1E:
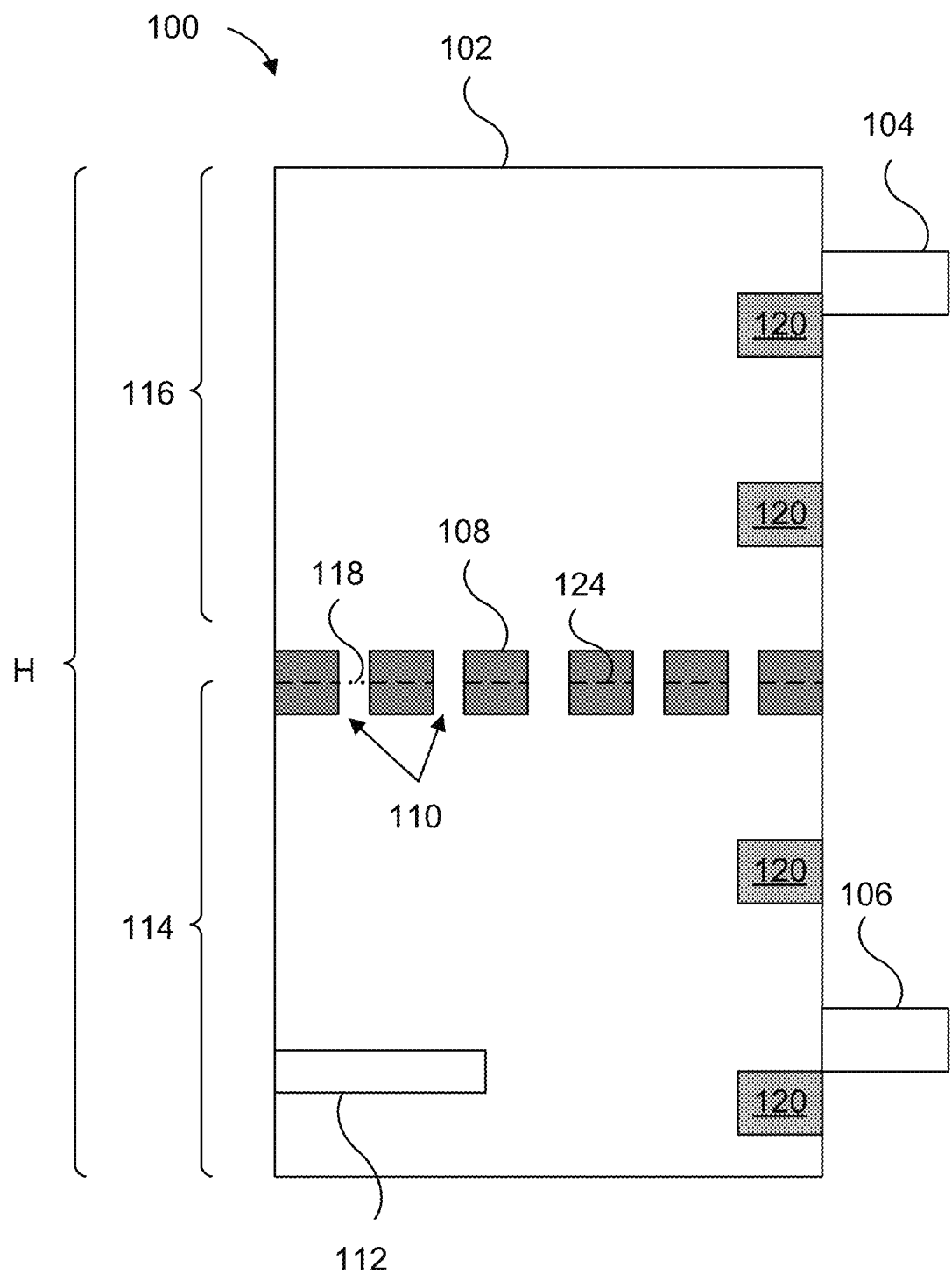
FIG. 1E illustrates a schematic diagram of a liquid heating device including an additional example partition, in accordance with the disclosed technology.

As illustrated in FIGS. 1A through 1F, the non-variable partition 108 can have a variety of configurations. In FIGS. 1A and 1B, the non-variable partition 108 can have approximately the same shape as the inner cross-sectional shape of the tank 102 and/or can have approximately the same outer circumference as the inner circumference of the tank 102 (e.g., the non-variable partition 108 can have a substantially disc-like shape). The non-variable partition 108 can include a single, circular aperture 110. The aperture 110 can be disposed at any location on the non-variable partition 108. By way of example, the aperture 110 can be disposed at the center of the non-variable partition 108. Alternatively, the aperture 110 can be located at an off-center location 108, as illustrated in FIG. 1B. The aperture 110 can have a diameter 118 of any size. By way of example, the aperture 110 can have a diameter 118 of between approximately 5 millimeters and approximately 10 millimeters.

As illustrated in FIGS. 1C and 1D, the non-variable partition 108 can have a substantially inverted conical shape and include a single aperture 110 disposed at the center of the non-variable partition 108. When the heating element 112 and the outlet 106 are disposed within the bottom portion 114 and the inlet 104 is disposed within the top portion 116, the substantially inverted conical shape of the non-variable partition 108 can create trapping regions 122. As the water within the bottom portion 114 becomes heated via the heating element 112, the trapping regions 122 can help prevent the heated water from flowing through the aperture 110 to the top portion 116, thereby maintaining separation of heated water within the bottom portion 114 and unheated or less heated water within the top portion 116 of the tank 102. The aperture 110 can have a diameter 118 of any size. By way of example, the aperture 110 can have a diameter 118 of between approximately 5 millimeters and approximately 10 millimeters. Optionally, the aperture 110 can have a diameter 118 of between approximately 10 millimeters and approximately 25 millimeters. Optionally, the aperture 110 can have a diameter 118 of between approximately 25 millimeters and approximately 50 millimeters. Optionally, the aperture 110 can have a diameter 118 greater than approximately 50 millimeters. Optionally, the diameter 118 of the aperture 110 can depend on the size of the tank 102. The appropriate size of the aperture 110 can change depending on the size of the tank 102. For example, the diameter 124 of the non-variable partition 108 (e.g., the internal diameter of the tank 102) can be approximately 4 times to approximately 24 times greater than the diameter 118 of the aperture 110.

Figure 1F:
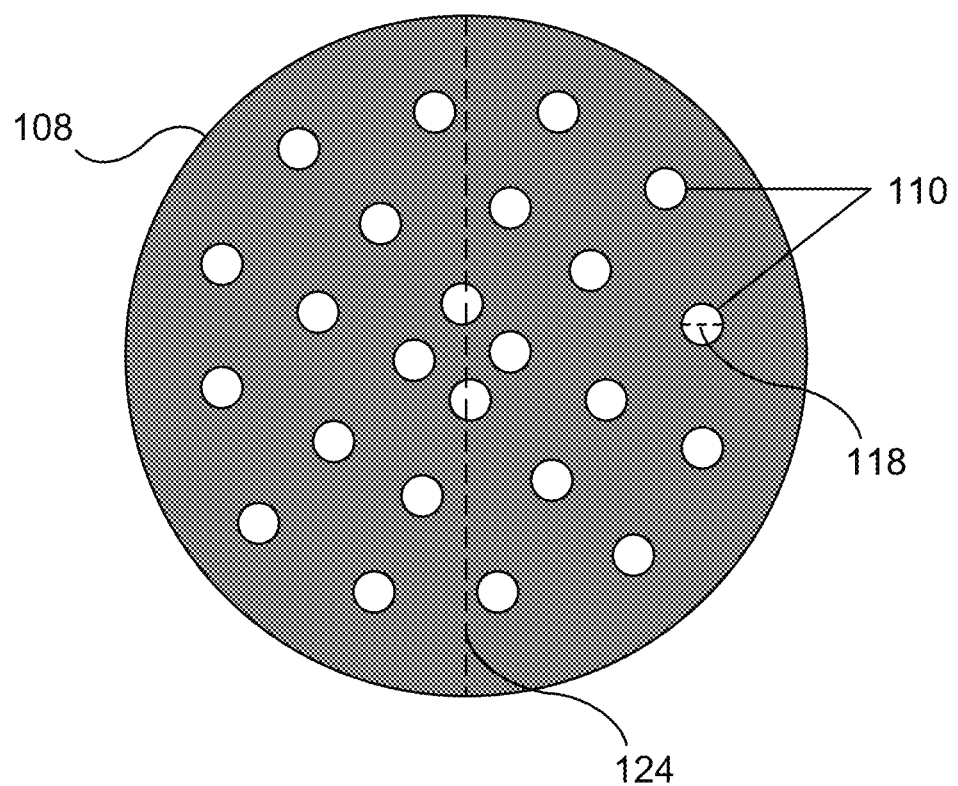
FIG. 1F illustrates a top view of the example partition of FIG. 1E, in accordance with the disclosed technology.

As illustrated in FIGS. 1E and 1F, the partition can include a plurality of apertures 110. As illustrated in FIG. 1A, the non-variable partition 108 can have approximately the same outer circumference as the inner circumference of the tank 102 such that the partition can have a substantially disc shape. The non-variable partition 108 can include any number of apertures 110. The apertures 110 can be arranged in a particular pattern, arrangement, or configuration. Alternatively, the apertures 110 can be randomly oriented and/or arranged. The apertures 110 can have a diameter 118 of any size. Each aperture 110 can have the same diameter 118. Alternatively, one, some, or all of the apertures 110 can have different diameters 118. By way of example, each aperture 110 can have a diameter 118 of between approximately 1 millimeter and approximately 5 millimeters. Optionally, each aperture 110 can have a diameter 118 of between approximately 5 millimeters and approximately 25 millimeters. Optionally, each aperture 110 can have a diameter 118 of between approximately 25 millimeters and approximately 50 millimeters. Optionally, each aperture 110 can have a diameter 118 greater than approximately 50 millimeters. Optionally, the diameter 118 of each aperture 110 can depend on the size of the tank 102. For example, the diameter 124 of the non-variable partition 108 can be approximately 4 times to approximately 24 times greater than the diameter 118 of each aperture 110.

Although FIGS. 1A through 1F illustrate a tank 102 having a single non-variable partition 108, it is contemplated the tank 102 can include any number of partitions 108. By way of example, the tank 102 can include a first partition and a second partition such that the tank 102 can be divided into three portions. Each non-variable partition 108 can include an aperture 110 such that water can fluidly flow between each portion.

FIGS. 2A to 2D illustrate the liquid heating device 100 having a variable partition 208 disposed within the tank 102. The variable partition 208 can divide the tank 102 into the bottom portion 114 and the top portion 116. The bottom portion 114 can include a volume of water below the partition 208 and the top portion 116 can include a volume of water above the top portion 116. The volume of water in the bottom portion 114 and the top portion 116 can vary depending on the position of the variable partition 208. Although FIGS. 2A through 2D illustrate the tank 102 as receiving water from the inlet 104 in the top portion 116 and having an outlet 106 for outputting heated water from the bottom portion 114, it is contemplated that the inlet 104 and the outlet 106 can be disposed in any configuration (e.g., the inlet 104 can be in the bottom portion 114 and the outlet 106 can be in the top portion 116, the inlet 104 and the outlet 106 can be in the same portion). The tank 102 can include the heating element 112. The heating element 112 can be disposed in either the top portion 116 or the bottom portion 114. As illustrated in FIGS. 2A through 2D, the heating element 112 can be disposed in the same portion as the outlet 106, which can help facilitate the output of heated water. The variable partition 208 can include one or more apertures 110 such that the bottom portion 114 and the top portion 116 are in fluid communication. The aperture 110 can have a diameter of any size. For example, the aperture 110 can have a diameter of between approximately 5 millimeters and approximately 10 millimeters. Optionally, the aperture 110 can have a diameter 118 of between approximately 10 millimeters and approximately 25 millimeters. Optionally, the aperture 110 can have a diameter 118 of between approximately 25 millimeters and approximately 50 millimeters. Optionally, the aperture 110 can have a diameter 118 of greater than 50 millimeters. When the variable partition 208 includes more than one aperture 110, each aperture 110 can have the same diameter 118. Alternatively, each aperture 110 can have a different diameter 118. The appropriate size of the aperture(s) 110 can change depending on the size of the tank 102. Optionally, the diameter 118 of the aperture(s) 110 can depend on the size of the tank 102. For example, the diameter 228 of the variable partition 208 (e.g., the internal diameter of the tank 102) can be approximately 4 times to approximately 24 times greater than the diameter 118 of the aperture(s) 110.

The variable partition 208 can be in mechanical communication with an actuator 202. The actuator 202 can be configured to linearly move at least a portion of the variable partition 208 based at least in part on the temperature of water within the tank 102. Optionally, the actuator 202 can be configured to linearly move the entire variable partition 208 upwards and/or downwards. Alternatively, the variable partition 208 can be attached to fixed location within the tank 102 such that the actuator 202 can linearly move only a portion of the variable partition 208. In this configuration, the actuator 202 can facilitate the variable partition 208 stretching and/or flexing approximately the center portion of the variable partition 208 upwards and/or downwards based at least in part on the temperature of water within the tank 102. If the temperature of water proximate to the variable partition 208 is greater than or equal to the threshold temperature and the temperature of water at a height above the variable partition 208 is below the threshold temperature, the actuator 202 can move the variable partition 208 upwards such that the volume of the bottom portion 114 increases, and thereby a greater volume of water can be heated to the set temperature. The threshold temperature can be approximately the set temperature. The threshold temperature can a predetermined amount above or below the set temperature. If the temperature of water below and/or proximate to the variable partition 208 is less than or equal to the threshold temperature, the actuator 202 can move the variable partition 208 downwards such that the volume of the bottom portion 114 decreases, thereby decreasing the amount of water within the same portion as the heating element 112, which can decrease the amount of time required to heat the water within the bottom portion 114 to the set temperature.

The tank 102 can include one or more temperature sensors 120 configured to determine a temperature of water within the tank 102. The number of temperature sensors 120 disposed within the tank 102 can depend on the volumetric size of the tank 102. By way of example, a tank 102 configured to store 25 gallons of water can include a greater number of temperature sensors than a tank 102 configured to store 10 gallons of water. A greater number of temperature sensors 120 can help obtain precise temperature measurements at various locations of the tank 102, although additional temperature sensors 120 can also increase the overall cost of the system 100. Optionally, the temperature sensors 216 can be arranged in an array, a predetermined pattern, or a predetermined arrangement within the tank 102. By way of example, the temperature sensors 120 can be disposed along a height H of a sidewall of the tank 102. In this configuration, the temperature sensors 120 can determine the temperature of water proximate to the temperature sensor 120.

The tank 102 can include one or more position sensors 218 configured to determine a position of the variable partition 208. The number of position sensors 218 can depend on the volumetric size of the tank 102, as a tank 102 configured to hold a greater volume of water can include a greater number of position sensors 218 than a tank 102 configured to hold a smaller volume of water. Optionally, the position sensors 218 can be arranged in an array, a predetermined pattern, or a predetermined arrangement within the tank 102. By way of example, the position sensors 218 can be disposed along the height H of the sidewall of the tank 102. Optionally, a temperature sensor 120 can be positioned with a corresponding position sensor 218, as illustrated in FIGS. 2A through 2D, such that the temperature of water at a particular position can be determined.

The liquid heating device 100 can include a controller 220. The controller 220 can be a computing device having memory and one or more processors, and the controller 220 can be configured to receive data, determine actions based on the received data, and output a control signal instructing one or more components of the liquid heating device 100 to perform one or more actions. The memory can have instructions stored thereon that, when executed by the processor(s), cause the controller to perform certain actions, such as those described herein. The controller 220 can be separate from, and in communication with, a controller of the system 100

(e.g., a master controller). Alternatively, the controller 220 can be configured to act as a master controller of the system 100.

One of skill in the art will appreciate that the controller 220 can be installed in any location, provided the controller 220 is in communication with at least some of the components of the system liquid heating device 100. By way of example, the controller 220 can be retrofitted to the tank 102 of the liquid heating device 100. Alternatively, the controller 220 can be located external to the liquid heating device 100. Furthermore, the controller 220 can be configured to send and receive wireless or wired signals and the signals can be analog or digital signals. The wireless signals can include Bluetooth™, BLE, WiFi™, ZigBee™, infrared, microwave radio, or any other type of wireless communication as may be appropriate for the particular application. The hard-wired signal can include any directly wired connection between the controller 220 and the other components. Alternatively, the components can be powered directly from a power source and receive control instructions from the controller 220 via a digital connection. The digital connection can include a connection such as an Ethernet or a serial connection and can utilize any appropriate communication protocol for the application such as Modbus, fieldbus, PROFIBUS, SafetyBus p, Ethernet/IP, or any other appropriate communication protocol for the application. Furthermore, the controller 220 can utilize a combination of wireless, hard-wired, and analog or digital communication signals to communicate with and control the various components. One of skill in the art will appreciate that the above configurations are given merely as non-limiting examples and the actual configuration can vary depending on the application.

The controller 220 can have or be in communication with a user interface for displaying information pertaining to the liquid heating device 100 and receiving inputs from a user. The user, for example, can input data pertaining to the set water temperature and/or the threshold water temperature.

The controller 220 can be in electrical communication with the one or more temperature sensors 120, the one or more position sensors 218, and the actuator 202 or at least one component of the actuator 202. The controller 220 can receive temperature data and position data from the temperature sensors 120 and the position sensors 218, respectively. In response, the controller 220 can output instructions to the actuator 202 to linearly move the variable partition 208 upwards or downwards, as further discussed herein.

Figure 2A:
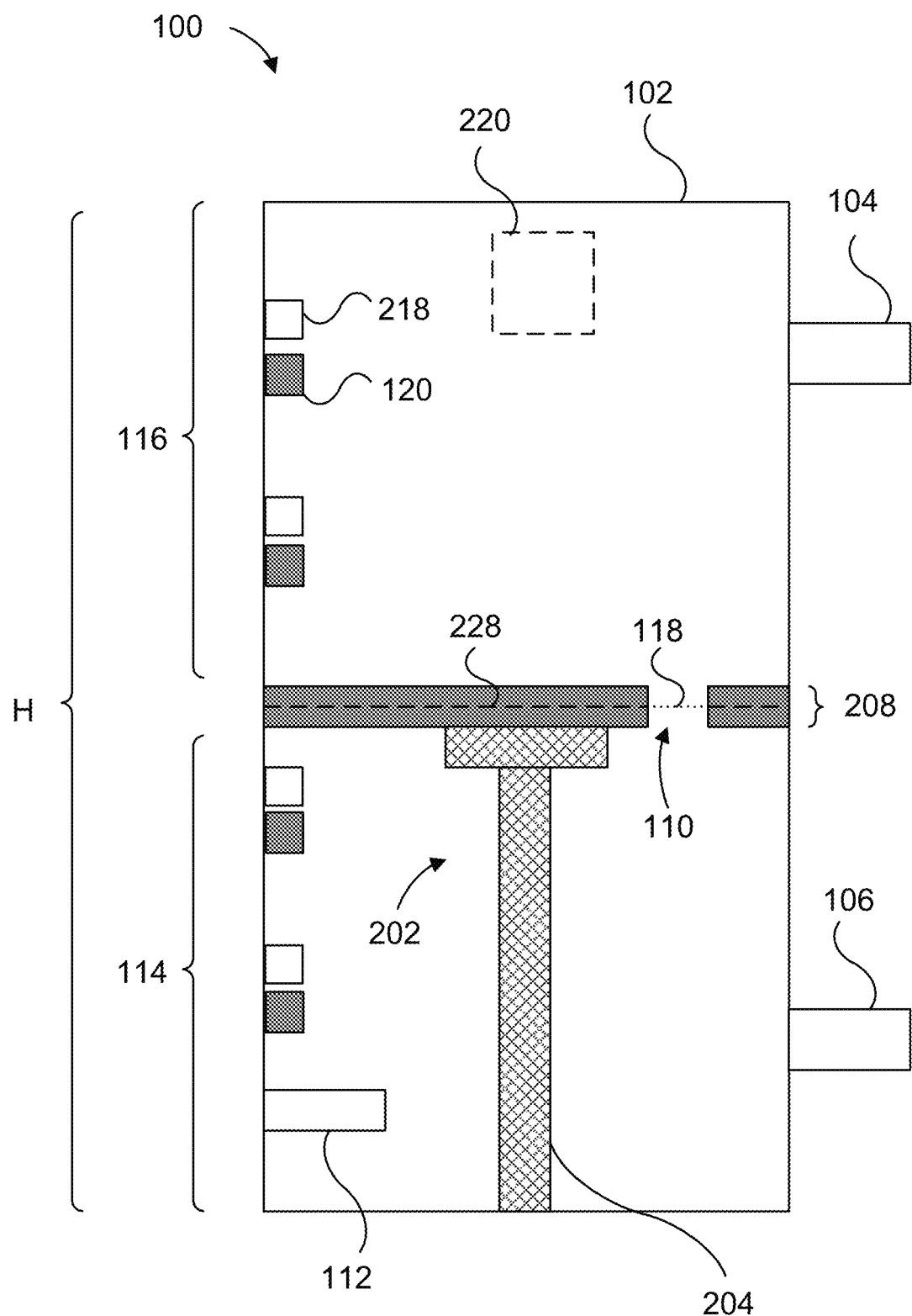
FIG. 2A illustrates a schematic diagram of a liquid heating device including an example variable partition and an example actuator, in accordance with the disclosed technology.

As shown in FIG. 2A, the actuator 202 can include a piston 204. The piston 204 can be actuated hydraulically or pneumatically, and the piston 204 can be configured to move upwards or downwards based on one or more detected temperatures from the temperature sensor(s) 120. The piston 204 can be filled with contents, including fluid and/or air, capable of expanding and retracting based at least in part on the temperature of water within the tank 102 or a portion of the tank 102. That is, the piston 204 can operate according to the phenomenon of a liquid's density changing in proportion to its temperature, such as in a Galileo thermometer. When the temperature of water proximate to the piston 204 is greater than or equal to the threshold temperature, the pressure of contents within the piston 204 can increase, thereby causing the piston 204 to extend and, in turn, moving the partition upward. Accordingly, the bottom portion 114 can increase in volume, allowing the bottom portion 114 of the tank 102 to hold a greater volume of heated water. As the bottom portion 114 expands in volume, water from the top portion 116 can flow into the bottom portion 114 via the aperture 110. Additionally, heat energy from the heated water within the bottom portion 114 and heat energy radiating from the heating element 112 can heat the influx of water from the top portion 116. Similarly, the heated water within the bottom portion 114 can gradually flow through the aperture 110 and into the top portion 116, thereby increasing the temperature of water within the top portion 116.

Conversely, when the temperature of water proximate to the piston 204 is less than or equal to the threshold temperature, the pressure of contents within the piston 204 can decrease, thereby causing the piston 204 to retract and, in turn, moving the partition downward. By way of example, when unheated water enters the tank 102 via the inlet 104, the variable partition 208 can be lowered via the piston 204. This can prevent the unheated water entering the tank 102 from substantially mixing with the heated water within the bottom portion 114. Accordingly, the water within the bottom portion 114 can remain at approximately the set temperature, and thus, can still be used upon a demand for heated water. Additionally, when unheated water entering the tank 102 via the inlet 104 is substantially prevented from mixing with the heated water within the bottom portion 114, the recovery time to heat the unheated water entering the tank 102 can be reduced as compared to liquid heating devices without such variable partition 208.

In some configurations, the piston 204 can extend and retract based at least in part on the temperature of water within the tank 102 without communication from the controller 220. Alternatively, the piston 204 can be in electrical communication with the controller 220. When the controller 220 and piston 204 are in electrical communication, on the controller 220 can receive temperature data and/or position data from the temperature sensors 120 and/or position sensors 218, respectively. In response, the controller 220 can output instructions to the piston 204 to linearly move the variable partition accordingly 208 as further described herein.

Figure 2B:
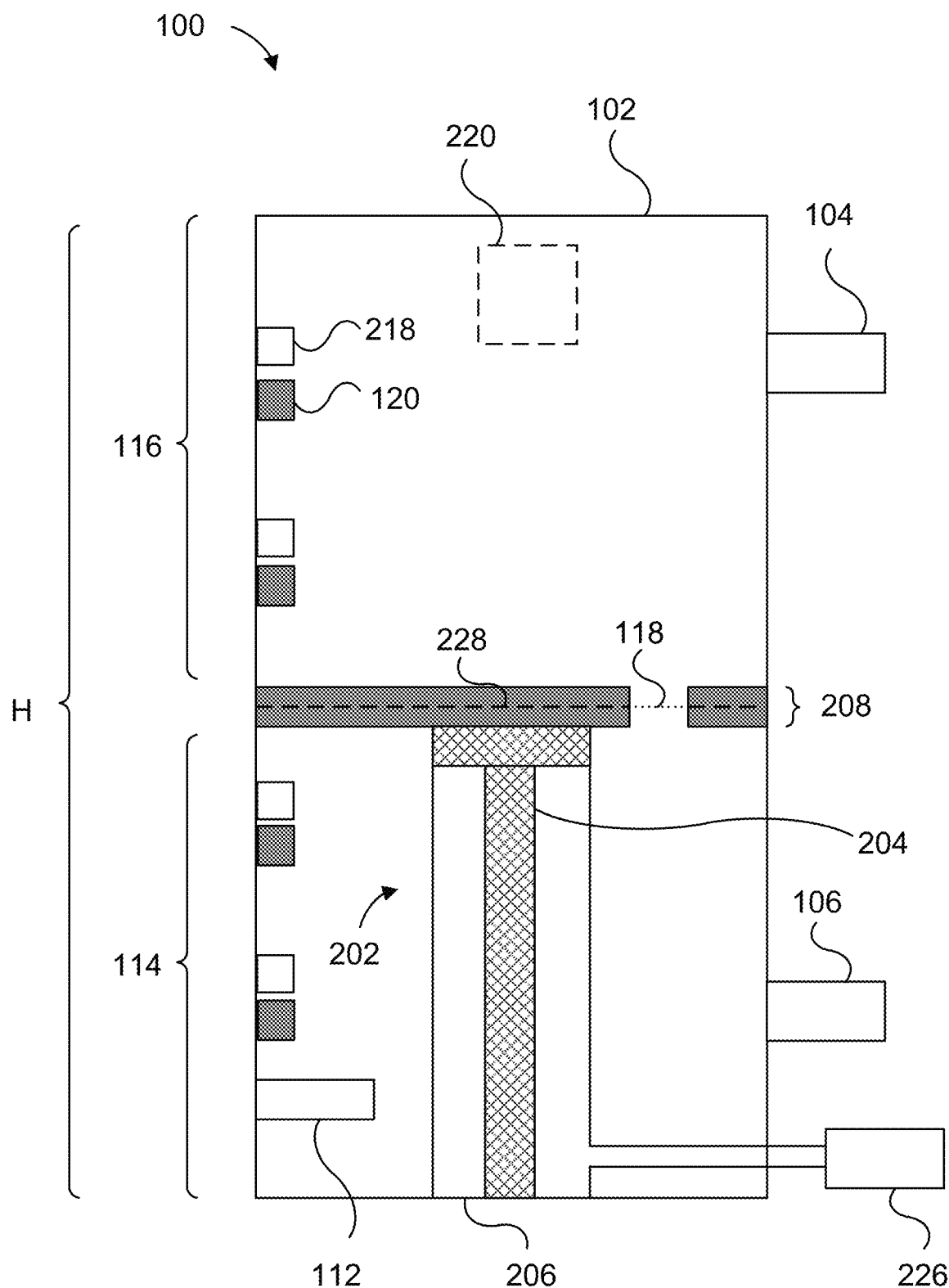
FIG. 2B illustrates a schematic diagram of a liquid heating device including an example variable partition and an additional example actuator, in accordance with the disclosed technology.

In FIG. 2B, the liquid heating device can include a piston 204 disposed within a cylinder 206 as the actuator 202. A pump 226 can be in fluid communication with the cylinder 206. The pump 226 can be a liquid pump. Alternatively, the pump 226 can be an air pump. When the pump 226 is a liquid pump, the cylinder 206 can be configured to receive liquid, including water, hydraulic oil, and the like (e.g., a hydraulic cylinder) via the pump 226. When the pump 226 is an air pump, the cylinder 206 can be configured to receive air (e.g., a pneumatic cylinder) via the pump 226. In If the controller 220 determines the temperature of water proximate the variable partition 208 is greater than or equal to the threshold temperature and the temperature of water at a height above the variable partition 208 is less than the threshold temperature, the controller 220 can output instructions to the pump 226 to direct air or liquid to the cylinder 206, thereby causing an increase in pressure within the cylinder 206 resulting in the piston 204 extending upwards. When the piston 204 extends upwards, the variable partition 208 can correspondingly move upwards in relation to the height H of the tank 102. Air or water can be directed to the cylinder 206 manually. Alternatively, the pump 226 and/or one or more valves of the pump 226 can be in electrical communication with the controller 220 and can receive instructions from the controller 220 to open the valves such that air or liquid can enter the cylinder 206. Heated water and heat energy from the bottom portion 114 can gradually flow through the aperture 110, thereby increasing the overall temperature of the water within the tank 102 until the set temperature is reached. If the controller 220 determines the temperature of water below and/or proximate the variable partition 208 is less than the threshold temperature, the controller 220 can output instructions to the pump 226 to remove air or liquid from the cylinder 206, thereby causing a decrease in pressure resulting in the piston 204 retracting. As the piston 204 retracts, the variable partition 208 can correspondingly move downwards in relation to the height of the tank 102.

Figure 2C:
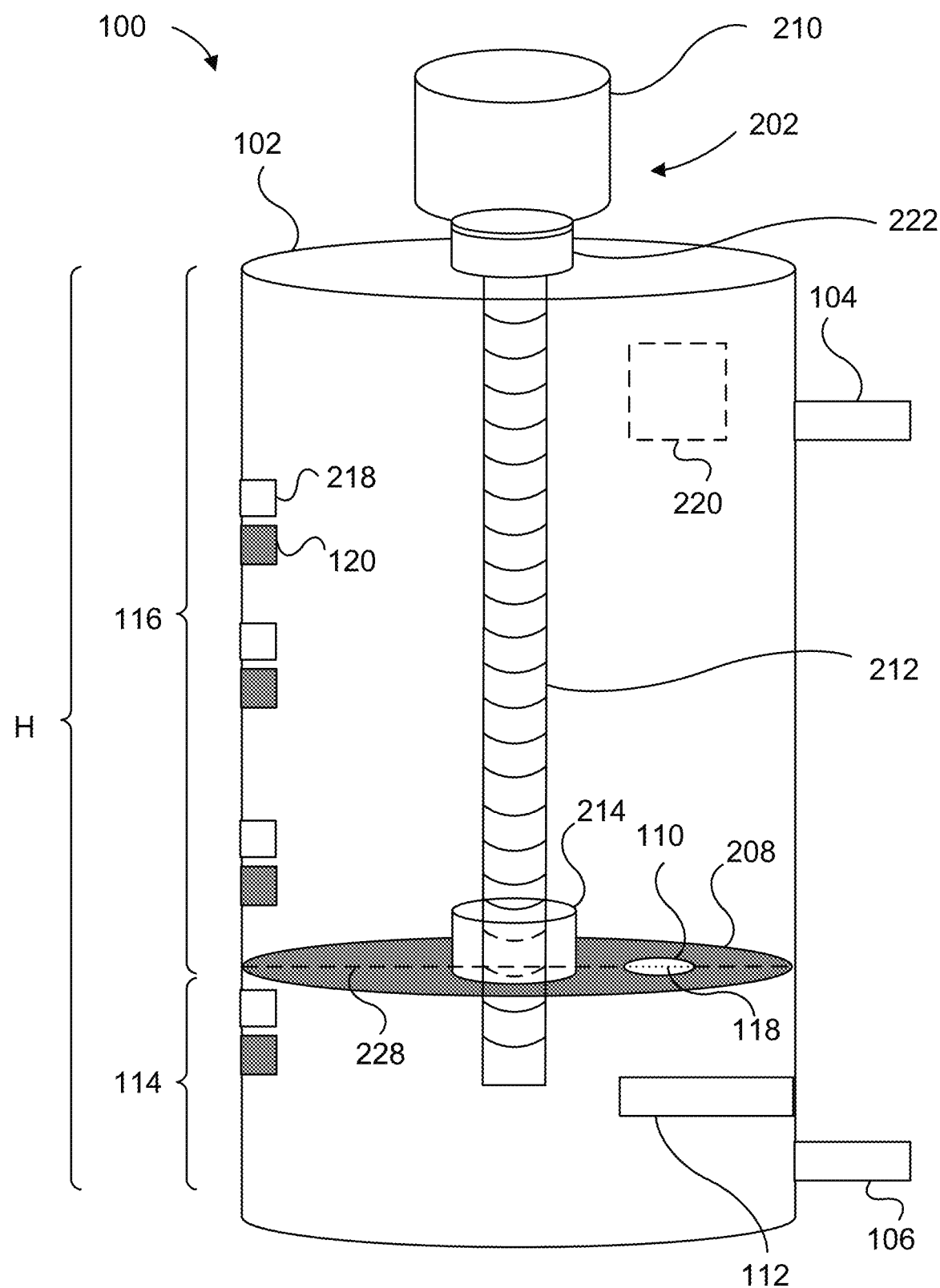
FIG. 2C illustrates a schematic diagram of a liquid heating device including an example variable partition and an additional example actuator, in accordance with the disclosed technology.

As shown in FIG. 2C, the actuator 202 can include a motor 210. For example, the motor 210 can be or include a stepper motor. The motor 210 can be positioned proximate the liquid heating device 100. By way of example, the motor 210 can be positioned on a top surface of the tank 102. The variable partition 208 can include an opening sized to receive a shaft 212. The shaft 212 can extend approximately the height H of the tank 102. The shaft 212 can be threaded to facilitate moving the variable partition 208. The shaft 212 can be in mechanical communication with the motor 210 via a coupling 222. A threaded screw 214 can be disposed on the shaft 212 and proximate or on a top surface of the variable partition 208 such that the variable partition 208 and shaft 212 are in mechanical communication. Alternatively, the shaft can include a plurality of linearly aligned notches, and the motor 210 can be configured to rotate a gear in communication with notches such that the motor 210 can move along the length of the shaft 212.

The controller 220 can determine, based on temperature data from the temperature sensors 120 and position data from the position sensors 218, to linearly move the variable partition 208 upwards or downwards. By way of example, the controller 220 can receive temperature data and position data from the temperature sensors 120 and the position sensors 218, respectively. Based on the temperature data and the position data, the controller 220 can determine the temperature of water 6 inches above the variable partition 208 is above the threshold temperature and the temperature of water 12 inches above the variable partition 208 is below the threshold temperature. In response, the controller 220 can output instructions to the motor 210 to effectuate linear movement of the variable partition 208. When the motor 210 is a stepper motor, a rotor within the motor 210 can rotate a predetermined amount in a first direction. The rotation of the rotor can move the threaded screw 214 upwards along the shaft 212, thereby moving the variable partition 208 upwards. Similarly, if the controller 220 determines the temperature of water 6 inches below the variable partition 208 is less than threshold temperature, the controller 220 can output instructions to the motor 210 to cause the rotor to rotate a predetermined amount in a second direction (e.g., opposite of the first direction). The rotation of the rotor in the second direction can move the threaded screw 214 downwards along the shaft 212, thereby moving the variable partition 208 downwards.

The motor 210 can be designed such that each rotation or partial rotation can move the variable partition 208 upwards or downwards a predetermined amount such that the current location of the motor 210 and/or the variable partition 208 can be determined based on the number and direction of previous rotations (i.e., without input from the position sensors 218). Alternatively, the motor 210 can be in electrical communication with controller 220 and can move upwards or downwards based on position data from the position sensors 218.

The aperture 110 of the variable partition 208 can facilitate fluid communication between the bottom portion 114 and the top portion 116. As the temperature of water within the bottom portion 114 increases to the set temperature (and after the water in the bottom portion 114 has reached the set temperature), heated water and heat energy can flow from the bottom portion 114 to the top portion 116, thereby heating the water within the top portion 116 to the set temperature. Similarly, as the variable partition 208 is moved upwards, unheated or less heated water from the top portion 116 can flow through the aperture 110 and to the bottom portion 114 such that a greater volume of water within the bottom portion 114 can be heated and maintained separate from the unheated or less heated water remaining in the top portion 116. The variable partition 208 can create a thermal barrier within the tank 102, and thus, the variable partition 208 can slow the process of thermal stratification. Accordingly, the variable partition 208 can reduce the length of time until at least a portion of the water within the tank 102 reaches the set temperature can be reduced and the recovery time to reheat water to the set temperature upon an influx of unheated water can also be reduced, as compared to liquid heating devices without the variable partition 208.

Figure 2D:
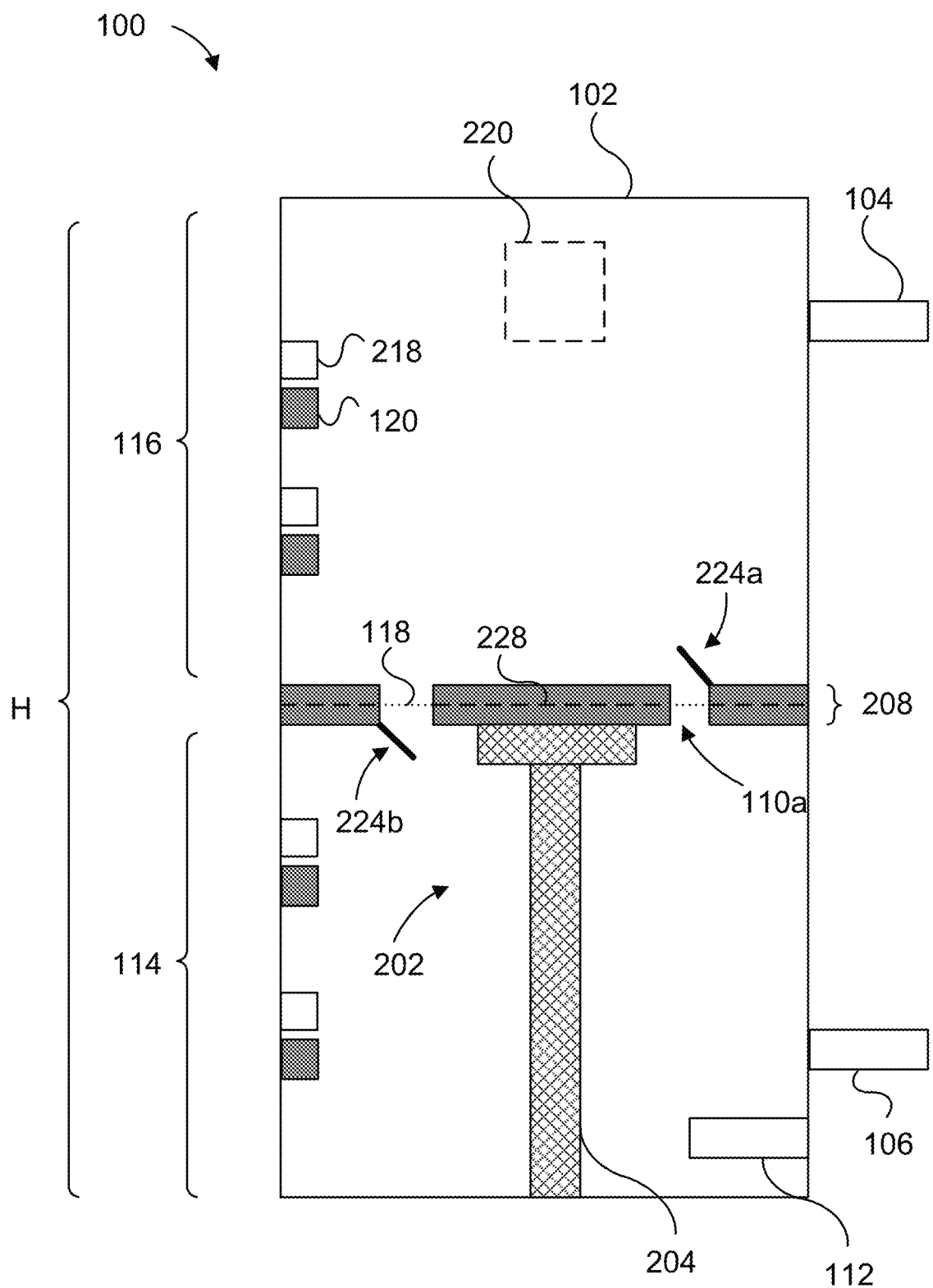
FIG. 2D illustrates a schematic diagram of a liquid heating device including an example variable partition with one or more valves, in accordance with the disclosed technology.

FIG. 2D illustrates the liquid heating device 100 including the variable partition 208 with one or more valves 224. As illustrated in FIG. 2D, the variable partition 208 can include a first valve 224a and a second valve 224b. The valves 224 can be one-way valves configured to open and/or close in response to the variable partition 208 linearly moving upwards or downwards via the actuator 202. When the variable partition 208 is not moving, the valves 224 can be closed. In this configuration, the bottom portion 114 and the top portion 116, fluid flow between the portions 114, 116 can be temporarily suspended. When the valves 224 are closed and no water is flowing between the portions 114, 116 via the apertures 110 heated water within the bottom portion 114 can be kept separated from unheated or less heated water within the top portion 116. When the variable partition 208 is moving upwards or downwards via the actuator 202, at least one valve 224 can be opened and at least one valve 224 can be closed due to a pressure differential. When the variable partition 208 is moving upwards, the first valve 224a can be opened to facilitate heated water from the bottom portion 114 to flow to the unheated water within the top portion 116. Additionally, when the variable partition 208 is moving upwards, the increased water pressure can close the second valve 224b. When the variable partition 208 is moving downwards, the second valve 224b can be opened, while the first valve 224a can be closed.

Optionally, the valves 224 can be in electrical communication with the controller 220. The controller 220 can receive one or more signals from the temperature sensors 120 and/or the position sensors 218 indicative of the temperature of water at various heights within the tank 102 and the position of the variable partition 208 within the tank 102. In response, the controller 220 can determine whether to linearly move the variable partition 208 and/or whether to open and/or close the valves 224. By way of example, the controller 220 can output instructions to the actuator 202 to linearly move the variable partition 208 upwards from the first position to a second position with respect to the height H of the tank 102. The controller 220 can further send one or more signals to the first valve 224a to open such that heat energy and heated water can flow from the bottom portion 114 to the top portion 116. The controller 220 can receive additional temperature data and position data indicative of the temperature within the tank. If the controller 220 determines that the variable partition 208 should be linearly moved upwards, the controller 220 can output instructions to the actuator 202 to move the variable partition 208 from the second position to a third position, instructions to the first valve 224a to open, and instructions to the second valve 224b to close. The process of moving the variable partition 208 upwards to the next predetermined position can repeat until the entire volume of water within the tank 102 is substantially heated to the set temperature or until the controller receives a signal from the temperature sensors 120 and position sensors 218 indicative of the temperature of water being less than the threshold temperature below the variable partition 208. In response to receiving one or more signals, the controller 220 can output instructions to the actuator 202 to linearly move the variable partition 208 downwards. By way of example, the controller 220 can output instructions to the actuator 202 to linearly move the variable partition 208 from the third position to the second position. The controller 220 can further output instructions to the first valve 224a to close and the second valve 224b to open while the actuator 202 linearly moves the variable partition 208.

The valves 224 can meter the flow of water between the bottom portion 114 and the top portion 116, thereby substantially maintaining separation of heated water and unheated or less heated water within the tank 102 during the water heating process. Accordingly, the bottom portion 114 can relatively quickly reach the set temperature, as only a partial volume of water within the tank 102 must be heated to the set temperature. Thereby, the water within the bottom portion 114 can be outputted for domestic and other uses upon the bottom portion 114 reaching set temperature rather than having to wait for the entire volume of water within the tank 102 to reach the set temperature prior to outputting heated water for domestic and other uses. Similarly, when temperature of water within the tank 102 is decreasing due to an influx of unheated water via the inlet 104, the variable partition 208 can be moved downwards in order to maintain heated water within the bottom portion 114 and substantially prevent mixing of the heated water within the bottom portion 114 and unheated or less heated water within the top portion 116, thereby allowing for continued output of heated water.

FIGS. 2A through 2D illustrate several example actuators 202. However, it is contemplated that any actuator 202 capable of linearly moving the variable partition 208 within the tank 102 can be used. By way of example, the actuator 202 can include a bladder containing compressed air and being configured to expand and deflate upon a change in temperature of water, a bi-metal disk, a spring, and the like.

Further, it is contemplated that the tank 102 can include any combination of the disclosed technology. For example, the tank 102 can include one or more non-variable partitions 108 in combination with one or more variable partitions 208.

Figure 3:
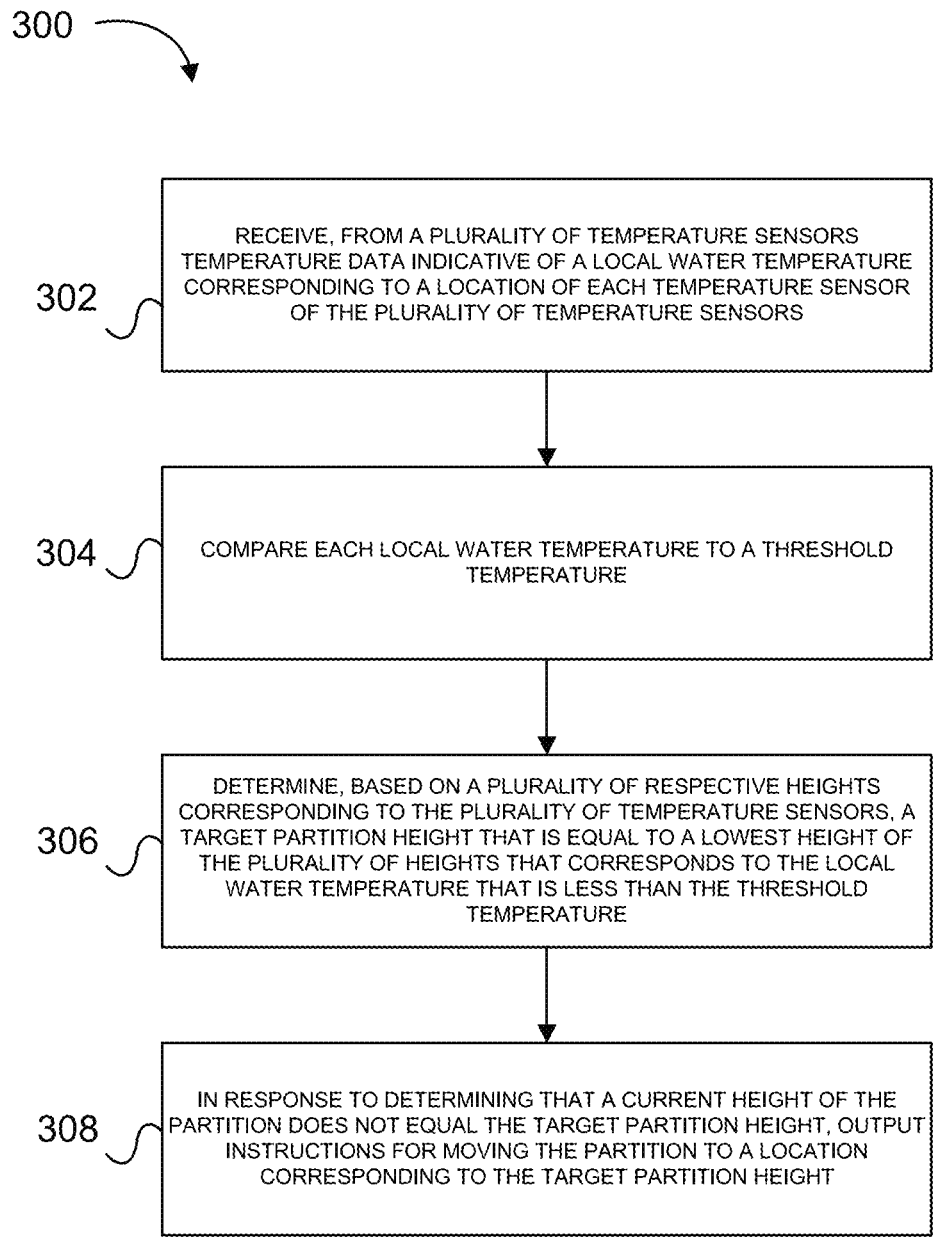
FIG. 3 is a flow diagram outlining a method of moving a variable partition within a liquid storage tank, in accordance with the disclose technology.

FIG. 3 illustrates a method 300 of linearly moving the variable partition 208 within the tank 102. The method 300 can include receiving 302, from a plurality of temperature sensors 120, temperature data and position data indicative of a local temperature of water corresponding to a location of each temperature sensor of the plurality of temperature sensors. By way of example, the controller 220 can receive temperature data from a first temperature sensor 120 indicative of a first local temperature of water within the tank 102 at a first height, the controller 220 can further receive temperature data from a second temperature sensor 120 indicative of a second local temperature of water within the tank 102 at a second height, and the controller 220 can further receive temperature data from a third temperature sensor 120 indicative of a third local temperature of water within the tank. Any number of temperature sensors 120 can be disposed within the tank 102 to provide precise local temperature measurements at various heights. The method 300 can include comparing 304, by the controller 220, each local temperature of water to a threshold temperature. The threshold temperature can be a singular temperature or a range of temperatures. The threshold temperature be approximately the set temperature (e.g., between approximately 120° F. to approximately 140° F.). The threshold temperature can a predetermined amount above or below the set temperature. The method 300 can include determining 306, by the controller, based on a plurality of respective heights corresponding to the plurality of temperature sensors, a target partition height that is approximately equal to a lowest height of the plurality of heights that corresponds to the local temperature of water that is less than the threshold temperature. In response to determining the current height of the partition does not equal the target partition height, the method 300 can further include outputting 308 instructions by the controller for moving the variable partition 208 to a location corresponding to the target partition height. Optionally, the controller 220 can include an internal algorithm that can make such determinations.

By way of example, the controller 220 can determine the first local temperature of water at the first height of three inches above the variable partition 208 is greater than or equal to the threshold temperature, the second local temperature of water at the second height of six inches above the variable partition 208 is less than the threshold temperature, and the third local temperature of water at a third height of nine inches above the variable partition 208 is less than the threshold temperature. Accordingly, the controller 220 can determine the target partition height is approximately six inches above the current position of the variable partition 208. In response, the controller 220 can output instructions to the actuator 202 to linearly move the variable partition upwards to the target partition height (e.g., approximately six inches upwards). Thereby, the bottom portion 114 of the tank 102 can hold a greater volume of water, and thus, a greater volume of water can be heated to approximately the set temperature. As the bottom portion 114 becomes heated to approximately the set temperature, heated water and/or heat energy can gradually rise and enter the top portion 116 via the aperture 110 of the variable partition 208.

As an alternative example, the controller 220 can determine the first local temperature of water at the first height of three inches above the variable partition 208 is less than the threshold temperature, the second local temperature of water at the second height of three inches below the variable partition 208 is less than the threshold temperature, and the third local temperature of water at a third height of six inches below the variable partition 208 is less than the threshold temperature. Accordingly, the controller 220 can determine the target partition height is approximately six inches below the current position of the variable partition 208. In response, the controller 220 can output instructions to the actuator 202 to linearly move the variable partition 208 downwards to the target partition height (e.g., approximately six inches downwards). Thereby, the volume of water within the bottom portion 114 can be reduced, such any heated water within the bottom portion 114 can remain separated from unheated water within the top portion 116. Further, by reducing the volume of water within the bottom portion 114, the amount of time to heat the water within the bottom portion 114 to the set temperature can be reduced as compared to heating the water within the entire tank 102 to the set temperature.

Certain examples and implementations of the disclosed technology are described above with reference to block and flow diagrams according to examples of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams do not necessarily need to be performed in the order presented, can be repeated, or do not necessarily need to be performed at all, according to some examples or implementations of the disclosed technology. It is also to be understood that the mention of one or more method steps does not preclude the presence of additional method steps or intervening method steps between those steps expressly identified. Additionally, method steps from one process flow diagram or block diagram can be combined with method steps from another process diagram or block diagram. These combinations and/or modifications are contemplated herein.

What is claimed is:

1. A liquid storage tank comprising:
a tank configured to hold a liquid therein;
a heating element disposed within the tank;
an inlet for receiving unheated liquid into the tank;
an outlet for outputting heated liquid from the tank; and
a thermal partition configured to divide an interior space of the tank into a first portion, which includes the heating element and the outlet, and a second portion, which includes the inlet, wherein the first portion is below the second portion,
wherein the thermal partition has an aperture through which the first portion and the second portion are in fluid communication, and
wherein the thermal partition has a conical shape which tapers toward the first portion such that the aperture is positioned at a lowest point of the conical shaped thermal partition.

2. The liquid storage tank of claim 1, wherein an outer diameter of the thermal partition is between 4 times and 24 times greater than a diameter of the aperture.

3. The liquid storage tank of claim 2, wherein the aperture is disposed at the center of the thermal partition and the outer diameter of the thermal partition is equal to the inner diameter of the tank.

4. The liquid storage tank of claim 1, wherein the aperture is one of a plurality of apertures in the thermal partition, and wherein a diameter of the thermal partition is between 4 and 24 times greater than a diameter of each of the plurality of apertures.

5. The liquid storage tank of claim 1, wherein the thermal partition is a first thermal partition and the liquid storage tank further comprises a second thermal partition, the first thermal partition and the second thermal partition being configured to divide the interior space of the tank into three portions.

6. The liquid storage tank of claim 1, wherein the thermal partition comprises a thermoplastic material.

7. The liquid storage tank of claim 1, wherein conical shape of the thermal partition is configured to form trapping regions in the first portion proximal to the thermal partition, the trapping regions configured to prevent heated water from flowing through the aperture to the second portion and thereby maintain separation of heated water within the first portion and unheated water within the second portion.

8. A liquid storage tank comprising:
a tank configured to hold a liquid therein;
a heating element disposed within the tank;
an inlet for receiving unheated liquid into the tank;
an outlet for outputting heated liquid from the tank;
a thermal partition to divide an interior space of the tank into a first portion and a second portion, the first portion positioned below the second portion, the thermal partition having a conical shape which tapers toward the first portion, and wherein the thermal partition has an aperture disposed at a lowest point of the conical shape such that the first portion and the second portion are in fluid communication; and
an actuator in mechanical communication with the thermal partition and configured to linearly move at least a portion of the thermal partition based at least in part on a temperature of liquid in the tank.

9. The liquid storage tank of claim 8, wherein an outer diameter of the thermal partition is between 4 times and 24 times greater than a diameter of the aperture.

10. The liquid storage tank of claim 8, wherein the actuator comprises a piston.

11. The liquid storage tank of claim 8, wherein the actuator comprises a piston disposed within a cylinder, the cylinder being in fluid communication with a pump.

12. The liquid storage tank of claim 8, wherein the thermal partition includes an opening and the opening of the thermal partition is slidably disposed along a shaft, and
wherein the actuator comprises a motor, the motor being in mechanical communication with the shaft and configured to linearly move the thermal partition along the shaft.

13. The liquid storage tank of claim 8, further comprising:
a plurality of temperature sensors, each of the plurality of temperature sensors configured to determine a local liquid temperature of liquid in the tank; and
a plurality of position sensors configured to determine a position of the thermal partition within the tank.

14. The liquid storage tank of claim 13, wherein the plurality of temperature sensors is arranged along a height of the tank.

15. The liquid storage tank of claim 13, wherein the plurality of position sensors is arranged along a height of the tank.

16. The liquid storage tank of claim 13, wherein each temperature sensor of the plurality of temperature sensors is positioned proximate a position sensor of the plurality of position sensors.

17. The liquid storage tank of claim 13, further comprising a controller in electrical communication with the actuator and the plurality of temperature sensors, wherein the controller is configured to:
receive, from the plurality of temperature sensors, temperature data indicative of the local liquid temperature corresponding to a location of each temperature sensor of the plurality of temperature sensors;
compare each local liquid temperature to a threshold temperature;
determine, based on a plurality of respective heights corresponding to the plurality of temperature sensors, a target partition height that is equal to a lowest height of the plurality of heights that corresponds to a local liquid temperature that is less than the threshold temperature;
responsive to determining that a current height of the partition does not equal the target partition height, output instructions for moving the thermal partition to a location corresponding to the target partition height.

18. The liquid storage tank of claim 17, wherein the controller is further configured to: determine the current height of the thermal partition by receiving, from the plurality of position sensors, position data indicative of the current height of the thermal partition.

19. The liquid storage tank of claim 17, further comprising at least one valve disposed on the thermal partition, wherein the at least one valve is in operable communication with the controller, and wherein the controller is further configured to:
  output instructions to the at least one valve to open and close based at least in part on the temperature data.

20. The liquid storage tank of claim 8, wherein conical shape of the thermal partition is configured to form trapping regions in the first portion proximal to the thermal partition, the trapping regions configured to prevent heated water from flowing through the aperture to the second portion and thereby maintain separation of heated water within the first portion and unheated water within the second portion.

* * * * *